Patented Oct. 27, 1936

2,059,084

UNITED STATES PATENT OFFICE 2,059,084

METHOD FOR PRODUCING NEUTRAL ESTERS OF PHOSPHORIC ACID

Kurt Buchheim, Radebeul, near Dresden, Germany, assignor to Chemische Fabrik von Heyden, A. G., Radebeul, near Dresden, Germany, a corporation of Germany No Drawing. Application July 19, 1932, Serial No. 623,391. In Germany March 2, 1931

15 Claims. (Cl. 260—99.20)

This invention relates to the production of neutral esters of phosphoric acid with organic compounds containing hydroxyl groups.

According to the present invention I produce tertiary organic phosphates, i. e., esters of phosphoric acid with organic compounds, which contain a hydroxyl group linked directly to a carbon atom, from the corresponding esters of phosphorous acid by treating the said phosphorous acid esters with substances capable of yielding nascent oxygen.

As raw materials for this method I apply neutral esters of phosphorous acid with alcohols, such as methyl, ethyl, propyl, butyl, amyl alcohols, etc., or any other alcohol or representatives of the chemically related class of phenols, such as phenol, cresol, or of naphthol and other similar phenol, or of the substitution products of both said alcohols and phenols, such as phenylethylalcohol, chlorophenol, nitrophenol, propylphenol, bromophenol, pyrocatechol, bromonaphthol or the like.

The esters of phosphorous acid are known and may be produced by methods described in the chemical literature. Of such esters there are described, for instance, the tri-ethyl-phosphite in Liebig's Annalen der Chemie, vol. 256, page 272, the tri-isoamyl-phosphite in Ann. 92, page 350, the tri-phenyl-phosphite in Ann. 239, page 311.

Instead of starting with esters in which the phosphorous acid is combined with a definite alcohol or with a definite phenol, I may, if advantageous, start with mixed esters of the phosphorous acid with various alcohols, or phenols, in which case I obtain mixed esters of the phosphoric acid.

The oxidation may be effected with all materials, which by splitting off oxygen are transformed into a compound of lower stage oxidation, so for example with sulfuric acid, fuming sulfuric acid, sulfur-trioxide, arsenic pentoxide, vanadic acid anhydrous, nitrous oxides, including nitric acid, furthermore with hydrogen peroxide and peroxide, magnesium peroxide, calcium peroxide, barium peroxide, the peroxides of the heavy metals, particularly those of lead, manganese, etc. Moreover, per-acids and their salts, such as per-sulfuric acid, alkali and alkali earth metal per-sulfates, ammonium persulfate, furthermore alkali and alkali earth metal perborates, ammonium perborate, the alkali and alkali-earth metal per-carbonates, ammonium per-carbonate, potassium permanganate and other similar compounds may be resorted to for the operation of my new method.

The tertiary organic phosphates are already known. They are used as plasticizers and softening agents in the utilization of cellulose-esters, and serve for instance as ingredients in the manufacture of lacquers.

Up to now tertiary phosphoric acid esters were produced by treating organic hydroxyl compounds with the chlorides of phosphoric acid. This reaction, however, does not proceed completely in a considerable number of cases. In order to complete the reaction, one must heat the reaction products for a very long time and to high temperatures.

Compared with the processes of the prior art, the present invention has the advantage that one may start from the low priced and readily available phosphor-trichloride. The reaction between the phosphor-trichloride and the organic hydroxyl compounds proceeds very smoothly and at substantialy lower temperatures than with phosphoric acid chlorides. By the transformation of the phosphorous acid-esters into the corresponding esters of the phosphoric acid according to my new oxidation process I obtain the desired tertiary phosphates in a very good yield and at great purity.

Example I 100 parts, by weight, of triphenyl-phosphite or tricresylphosphite are put into a container, which is provided with an agitator and the walls of which are resistant to sulfuric acid and can easily be cooled in any suitable way. Then I admit into the triphenyl-phosphite a current of an inert gas, for instance, dry air, charged with sulfur trioxide gas, that within the time of 2–3 hours 30 parts, by weight, of such sulfur-trioxide are introduced into the triphenyl-phosphite. The agitation and cooling of the reaction mixture is suitably so regulated that the reaction temperature keeps within 20–30° C. at which temperature the sulfur-trioxide reacts immediately with the triphenyl-phosphite so that an even current of sulfurdioxide is continuously discharged. Towards the end of the reaction the fused mass assumes a syrupy consistency. At this period I add 4–5 times the volume of water, and agitate the mixture, which solidifies to a white crystalline mass which is triphenyl phosphate of great purity. I fuse then the mass while covered with water, neutralize and finally dry it. The yield is practically 100% and the product solidifies at 47.8–47.9° C. If I apply tricresylphosphite for the reaction I similarly obtain tricresylphosphate of the well known properties.

Example II

I introduce into 250 parts, by weight, of tributyl-phosphite (B. P. 105–108° at 1 mm.), a current of inert gas which is charged with 85 parts, by weight, of sulfur-trioxide, the reaction mass being cooled and agitated so as to keep the temperature at substantially 20° C. The reaction of the sulfur-trioxide gas is in the beginning rather violent, but sluggish towards the end. The generated sulfur-dioxide dissolves in the reaction mass and is discharged in small quantities only at the reaction. After all the sulfur-trioxide is entered, the reaction comes to an end. The reaction product shows a strongly acid reaction; it is, therefore, neutralized and washed in the way well known from the manufacture of arylphosphate. The yield is approximately 250 grams of tributyl phosphate, boiling at 115–118° C. at 1 mm.

The technical operation of the process is suitably operated in the following manner:

The crude phosphites are put into a digester provided with a jacket for cooling and having an agitator. The digester must be made of a material resistant to sulfur-trioxide, sulfur-dioxide and sulfuric acid; thus it could be made of copper, a lead-lined or enameled iron vessel. To oxidize the crude phosphite I withdraw the gaseous reaction products from a sulfur-trioxide furnace at as low a temperature as possible, for instance, at 10–15° C. and introduce said gases into the phosphite, whereby sulfur-dioxide is generated. The sulphur-dioxide is combined with air and admitted again into a contact furnace, or may be recovered in the form of sodium sulfite, or sodium bisulfite.

The reaction is at an end when an excess of sulfur-trioxide escapes without being absorbed. The end of the reaction may also be determined, for instance in the case of triphenyl-phosphite, by drawing a sample and testing it by cooling, the resulting phosphate solidifying at about 47° C.

When the reaction has come to an end, I blow air through the reaction product to remove therefrom, as much as possible, the sulfur dioxide dissolved in the product, transfer then the batch through a siphon into warm water of approximately 50° C. and wash the oil with a soda solution until it shows a neutral reaction. In case the oil is not absolutely free of color, I pass it through bone black filter and dry it.

The process must be suitably modified when I apply solid instead of gaseous oxidizing agents. I may gradually introduce small portions of the solid oxidizing agent into the constantly agitated neutral phosphite esters at the opportune reaction temperature, which often varies with the different kinds of oxidizing agents and must be first established by a test; however, the process does not have to be changed otherwise. After the oxidizing reaction the generated phosphoric acid ester is separated by filtration from any insoluble material present in the reaction product; if necessary, the product is washed, distilled in vacuo, or in case the obtained product is solid, it is purified by recrystallization.

When operating with sulfur-trioxide gases I may advantageously apply the dilute gases obtained in the production of sulfuric acid by the contact process.

The oxidation by means of sulfur-trioxide offers further advantages in the purification of the generated tertiary phosphates. If I work, for instance, with a small excess of sulfur-trioxide, the same combines with impurities, which may be present, such as phenols, which did not enter into the reaction, or with impurities usually found in phenols, by forming sulfonic acids which are dissolved from the end product by the ultimate washing process.

The group of alcohols and phenols concerned in this patent application may be suitably termed hydroxy derivatives of hydrocarbons having the hydroxyl groups linked to a carbon atom of the hydrocarbon.

What I claim is:

1. The method of producing neutral esters of phosphoric acid with aliphatic monohydric alcohols, said method comprising acting on the corresponding esters of phosphorous acid with substances capable of yielding nascent oxygen.

2. The method of producing neutral esters of phosphoric acid with monohydroxy phenols, said method comprising acting on the corresponding esters of phosphorous acid with substances capable of yielding nascent oxygen.

3. The method of producing neutral esters of phosphoric acid with aliphatic monohydric alcohols, said method comprising acting on the corresponding esters of phosphorous acid with sulfur-trioxide.

4. The method of producing neutral esters of phosphoric acid with aliphatic monohydric alcohols, said method comprising acting on the corresponding esters of phosphorous acid with gases containing sulfur-trioxide.

5. The method of producing neutral esters of phosphoric acid with monohydroxy phenols, said method comprising acting on the corresponding esters of phosphorous acid with sulfur-trioxide.

6. The method of producing neutral esters of phosphoric acid with monohydroxy phenols, said method comprising acting on the corresponding esters of phosphorous acid with gases containing sulfur-trioxide.

7. The method of producing neutral esters of phosphoric acid with phenol, said method comprising acting on triphenylphosphite with substances capable of yielding nascent oxygen.

8. The method of producing neutral esters of phosphoric acid with phenols, said method comprising acting on a triphenolicphosphite with substances capable of yielding nascent oxygen.

9. The method of producing neutral esters of phosphoric acid with monohydric alcohols, said method comprising acting on the corresponding esters of phosphorous acid with substances capable of yielding nascent oxygen.

10. The method of producing neutral esters of phosphoric acid with a bivalent phenol, said method comprising acting with substances capable of yielding nascent oxygen on the corresponding esters of phosphorous acid with a substance of aforesaid type of hydroxy derivatives.

11. The method of producing neutral esters of phosphoric acid with dihydroxy derivatives of aromatic hydrocarbons, said method comprising acting with substances capable of yielding nascent oxygen on the corresponding esters of phosphorous acid with pyrocatechol.

12. The method of producing a neutral ester of phosphoric acid with a substance selected from the group consisting of alcohols and phenols, comprising acting upon the corresponding ester of phosphorous acid with substances yielding nascent oxygen.

13. The method of producing a neutral ester of phosphoric acid with an alcohol, comprising acting upon the corresponding ester of phosphorous acid with substances yielding nascent oxygen.

14. The method of producing a neutral ester of phosphoric acid with a phenol, comprising acting upon the corresponding ester of phosphorous acid with substances yielding nascent oxygen.

15. The method of producing neutral esters of phosphoric acid with monohydroxy phenols, said method comprising acting on a triphenolic phosphite with substances capable of yielding nascent oxygen.

KURT BUCHHEIM.